May 20, 1958 G. W. BLESSING 2,835,776
APPARATUS FOR HEAT SEALING PLASTIC FILMS
Filed Jan. 18, 1954 2 Sheets-Sheet 1
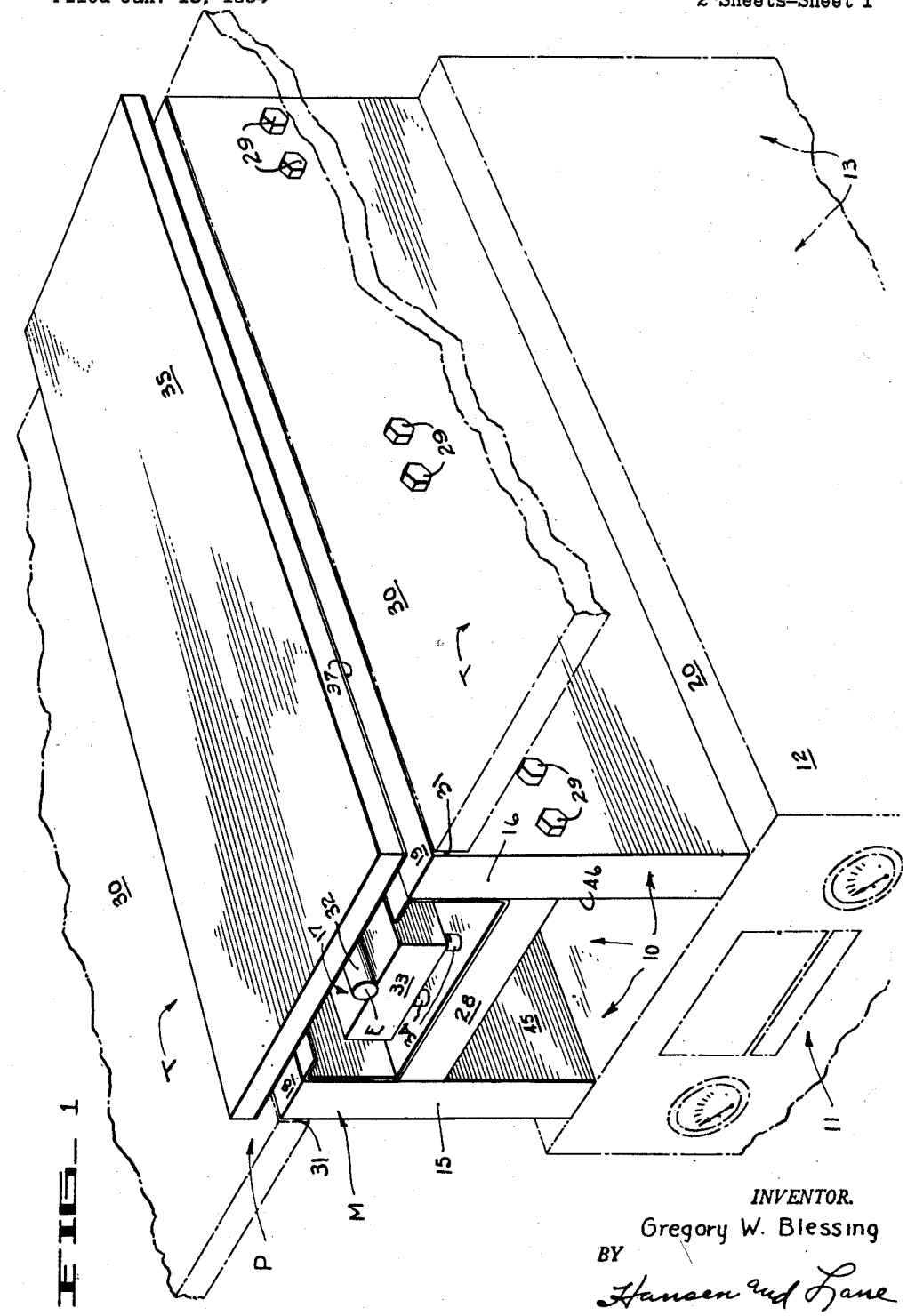
INVENTOR.
Gregory W. Blessing
BY
Hansen and Lane
HIS ATTORNEYS

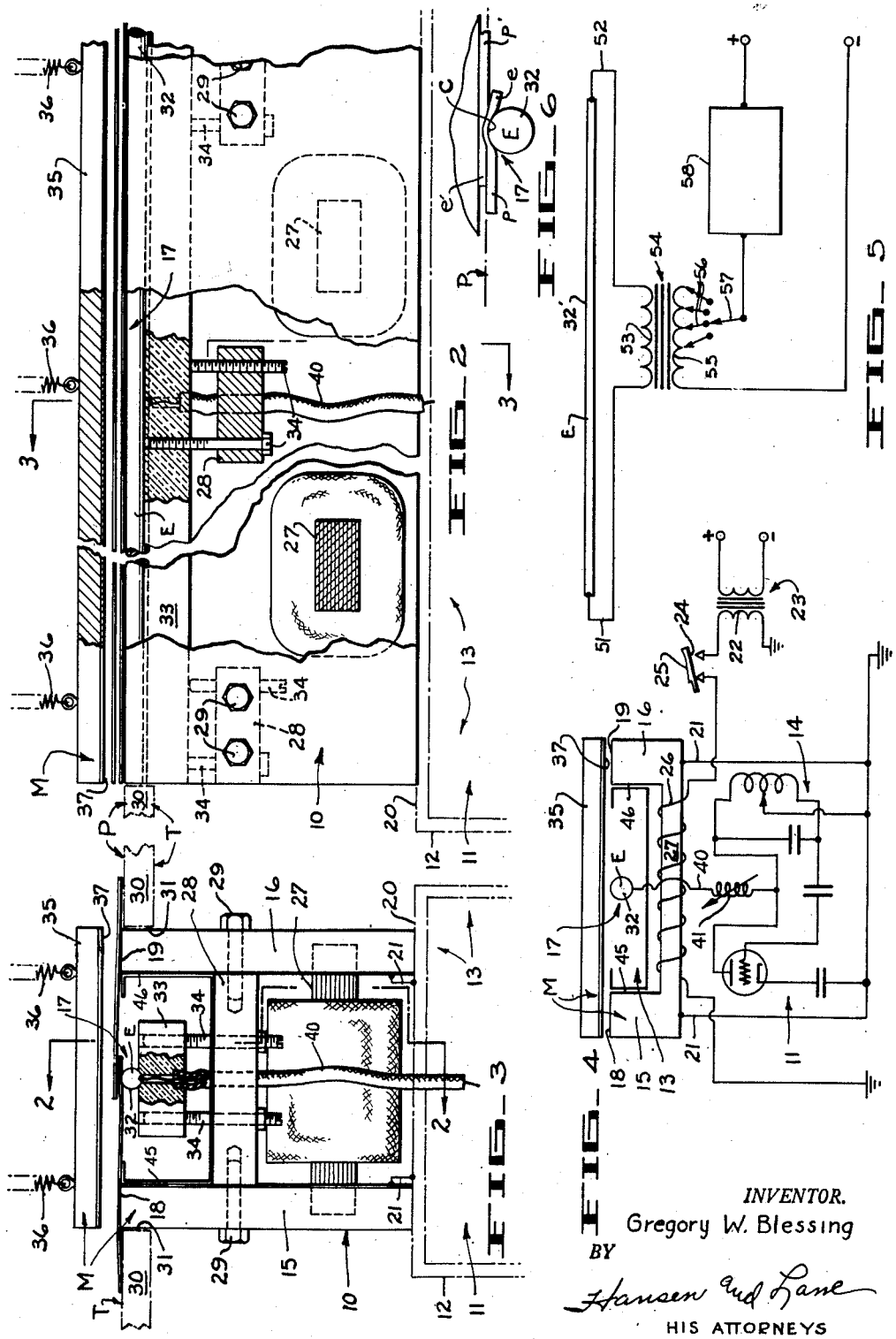

United States Patent Office 2,835,776
Patented May 20, 1958

2,835,776

APPARATUS FOR HEAT SEALING PLASTIC FILMS

Gregory W. Blessing, Los Altos, Calif., assignor to Electronics Process Corporation Application January 18, 1954, Serial No. 404,493

9 Claims. (Cl. 219—10.53)

This invention relates to heat sealing, bonding and/or welding of plastic films, sheeting or other such non-magnetic, non-conductive material. More particularly this invention is directed to certain novel improvements in the art of heat sealing especially in the type of such equipment which employs high frequency current for that purpose.

Heretofore and under older systems, high frequency current has been used for the purpose of sealing plastic films with satisfactory results. Moreover, in prior equipment a suitable shield such as copper or aluminum sheet foil or screen has been employed to minimize the escape of high frequency waves. While attempts have been made in prior devices to minimize the escape of high frequency waves, little success has been experienced in complete shielding of high frequency waves in these devices. This is a serious handicap to the operation of high frequency equipment of this type because under more recent regulations of the Federal Communications Commission the use of high frequency equipment has been prohibited in certain zones and areas where there is a likelihood of escaping high frequency waves interfering with or causing a disturbance in the operation of communication systems, such as radio, television and short wave receiving. As is well known, high frequency waves can cause disturbance in radio short wave communication systems not only locally but many miles away depending upon the output of the high frequency circuit.

The present invention contemplates the provision of a novel arrangement of electrode and press plate in combination with means for shielding the same against escape of high frequency waves during the sealing operation.

Most of the prior devices fail to successfully shield the escape of high frequency waves because the press itself becomes an antenna from which these waves can emanate. For example, most of the prior presses employ a goose-neck which overhangs the press bed or table. This goose-neck supports the upper or movable portion of the press and houses the high frequency element by which the sealing action is accomplished.

The present invention contemplates the provision of a sealing and pressure element in the form of an electrode directly above the high frequency unit so as to minimize the length of wire between the latter and the sealing electrode. In this connection the instant invention confines the sealing electrode within the press bed so that no overhanging arm or goose-neck is necessary.

This has several advantages over devices constructed in accordance with the prior art. One major advantage is that the potential antenna provided by an overhanging arm or goose-neck is avoided. This also avoids obstructions on the press bed top so that the material to be joined or welded can be spread flat over an unlimited area.

The combination of the present invention further provides a novel magnetic press in which electromagnets are confined within the press bed or table as close as possible to their source of power and adjacent the sealing electrode by which the heat sealing is accomplished.

Another object is to provide a press bed in which parallel magnets having between them an electrode attract a flat plate or platten toward the electrode to exert the necessary pressure for accomplishing sealing of the material disposed between the electrode and the platten. With this arrangement, the material is gripped firmly between the magnets and the platten to assure that the margins of the material being pressed together at the electrode cannot be stretched or pulled away from each other during the sealing operation.

From the foregoing it will be noted that a sealing zone is provided around the electrode embodied in the high frequency oscillator circuit. That is to say, the electrode is guarded on two sides by the magnets, from above by the platten, and below by the high frequency unit. With this arrangement I have provided a novel shield completely surrounding the electrode in such a manner that the high frequency waves, taking the course of least resistance, are confined to the inner surfaces of the sealing zone and therefore will not emanate or escape from the press bed.

Other objects and advantages of the present invention will become apparent in the following description in the light of the drawings in which:

Fig. 1 is a perspective view of a press bed employing the present invention.

Fig. 2 is a fragmentary longitudinal section through the press bed of Fig. 3 and taken along line 2—2 thereof.

Fig. 3 is a cross-sectional detail of the press bed taken substantially along line 3—3 in Fig. 2.

Fig. 4 is a diagram including the component parts embodied in the present invention.

Fig. 5 is a separate wiring diagram showing a modified form of heat sealing unit adapted to be used with the press bed embodying the present invention.

Fig. 6 is an enlarged scale fragmentary detail of a weld or bond being accomplished in accordance with the present invention.

Referring now to Figs. 1, 2 and 3, a device embodying the present invention and designated 10 is shown mounted on a high frequency generator 11 of well known design. This generator 11 consists of a cabinet 12 forming a shielded chamber 13 for housing an electronic oscillator circuit 14 and equipment for generating high frequency current suitable to energize an electrode E embodied in the present invention.

As best seen in Fig. 3, the device 10 includes a magnetic press M having a fixed bed comprising a pair of parallel bars 15—16 of magnetic material such as soft iron. These bars 15—16 are spaced from each other a distance suitable to form a sealing zone 17 between their upper portions and yet permit their support on the upper surface 20 of the cabinet 12 of the generator. In this manner the magnetic bars 15—16 are directly connected to the cabinet 12 to provide a ground potential for both direct and high frequency current. Thus the magnetic bars 15—16 are connected to one side of an electromagnetic circuit 21 by which the magnets are energized. The other side of the circuit 21 comes from a secondary winding 22 of a transformer 23 and includes a switch 24 preferably associated with a treadle 25 for operating the switch 24 to complete the electromagnetic circuit 21 to a coil 26 wound around a core 27 which bridges the space between the magnetic bars 15—16 to magnetize the latter. It will be noted in Fig. 2 that several cores 27 are employed depending upon the length of the magnetic bars which of course is determined by the length of weld or seal to be made in accordance with this invention.

In addition to the foregoing it will be noted that the magnetic bars 15—16 are held in spaced relation by cross bars 28 secured in place by bolts 29 to firmly support the bars 15—16 in parallel relation with their upper surfaces 18—19 in a common plane P. This plane P is in horizontal alignment with the top surface T of a table 30 which is cut out as at 31 to receive the upper portion of the device 10 as best illustrated in Figs. 1 and 3. The table 30 is thus arranged to support two ends e and e' of separate plastic sheeting p and p' to be welded or joined adjacent their edges.

It will be noted particularly in Fig. 3, as was hereinbefore explained, that the upper surfaces of the magnetic bars 15—16 are spaced to provide a sealing zone 17. The adjacent ends e and e' of the plastic sheets p—p' extend into this zone 17 sufficiently to overlap one another and to this end the overlapping ends e and e' must be supported substantially midway between the magnetic bars. In accordance with this invention the means for supporting the overlapped edges of the plastic sheeting comprises an elongated bar 32 preferably although not necessarily of round stock but definitely non-magnetic conductive material such as copper. It is this copper bar which constitutes the hot electrode E of the present invention having connection with the high frequency generator 11.

The copper bar 32 is of substantially the same length as the length of the magnetic bars 15—16, it being a little shorter as will later be made apparent for reasons of obtaining a maximum shield around the hot electrode E. The bar 32 is supported on a carriage 33 of non-conductive material which runs the full length of the bar 32 and is adjustable vertically by means of screws 34 threadedly mounted in the cross bars 28 by which the magnetic bars are spaced from each other.

In accordance with the present invention the bar 32 forms a part of the seal creating press and to this end is disposed in tangent relation to the plane P which is congruent to the top surfaces 18—19 of the electromagnets 15—16 respectively. This is accomplished by adjusting the screws 34 to position the bar 32 with its top edge tangent to the plane P so that the end (say e) of one of the plastic sheets (p) rests upon the bar 32 in the same horizontal plane as the top surface T of the table 30, i. e., the upper surfaces 18—19 of magnetic bars. It will thus be seen that the end (e') of the other sheet (p') rests upon the end (e) of the first mentioned sheet (p) and therefore is raised above the normal press plane P by the thickness of the lowermost sheet (p).

The movable portion of the press M comprises a flat plate or platten 35 of magnetically attractable material such as soft iron. This plate 35 covers the sealing zone 17 and therefore is of a length comparable to the length of the magnetic bars 15—16 and of a width sufficient to span the gap between the latter so as to be supported along its edges upon the top surfaces 18—19 of the magnetic bars. The plate 35 may be free for placement by hand over the sealing zone 17 as shown in Fig. 1 or as illustrated in Figs. 2 and 3, can be suspended slightly above the sealing zone by yieldable means, for example springs 36.

The lower surface 37 of the plate 35 is adapted to lie congruent to the plane P when supported upon the top surfaces 18—19 of the magnetic bars 15—16. However, when the plastic sheets p and p' are placed on the press bed as hereinbefore explained (see Fig. 3) the sheets p—p' act as separators. It should here be noted that the double thickness of the sheets p—p' where there ends overlap above the copper bar 32 would normally prevent the bottom surface 37 of the plate 35 from engaging both sheets p and p' and yet lie parallel to the upper surfaces 18—19 of the magnetic bars 15—16, i. e., the top surface T of the table 30. Consequently, when the magnetic bars 15—16 are energized by closing of the switch 24 the movable platten 35 is attracted toward the upper surfaces 18—19 of the magnetic bars and therefore tend to press the overlapped ends e—e' onto the upper extremity (which is tangent to plane P) of the copper bar 32. As best illustrated in Fig. 6, the force by which the platten 35 is attracted toward the magnetic bars 15—16 tends to compress the double thickness of plastic sheeting against the upper extremity of the copper bar 32 whereby the latter can impress an elongated groove or crease C into the double thickness of plastic sheeting.

In connection with the foregoing, a very important function on the part of the electromagnets 15—16 and the platten 35 relative to the sheets p—p' should be noted. When the magnets 15—16 attract the platten 35 down upon the sheets p—p', the latter are held firmly in clamp-like action to assure that the overlapped edges e—e' will not become displaced, stretched or otherwise distorted during the sealing operation irrespective of any movement of the balance of the sheets p—p' outside the sealing zone.

The pressure exerted on the overlapped edges e—e' by the magnetic attraction of the platten toward the bar 32 is not of itself sufficient to impress the crease C as required in completing the weld in the overlapped sheets p—p'. However, when the plastic sheets p and p' are heated, they become soft whereupon the platten 35 can be attracted tightly against the portions of the sheets p—p' resting upon the faces 18—19 of the magnetic bars. It will therefore be seen that simultaneous with the compressing action by the magnetic press the welding or bonding of the sheets together requires heating of the material at the point of weld.

As hereinbefore mentioned, the copper bar 32 is the electrode E having direct connection with the high frequency oscillator circuit 14 in the generator 11. This connection is accomplished by a short conductor 40 having one end secured to the electrode E (copper bar 32) substantially midway its ends, the opposite end of conductor 40 extending downwardly through the top surface 20 of the cabinet 12 for connection to one side of a tuning inductor 41 in the oscillator circuit 14 as best seen in Fig. 4. It should here be remembered that the magnetic bars 15—16 are grounded to the cabinet 12 of the generator and consequently these elements are included in the oscillator circuit 14. In addition to the foregoing the movable platten 35 which bridges the upper portions of the magnetic bars 15—16 serves as a switch for closing, i. e., making or completing the oscillator circuit 14 when the platten is magnetically attracted toward the bars 15—16. In this connection, the magnetic energy around the upper faces 18—19 of the bars 15—16 will align the platten 35 with the magnetic bars incident to the attraction of the platten 35 toward the bars 15—16. It will thus be seen that the platten 35 forms a cover for the otherwise open top of the sealing zone 17. Therefore, when the movable platten is seated on the press bed, the high frequency current which is fed directly to the electrode E travels by di-electric capacity through the overlapped ends e—e' of the plastic sheets to the lower surface 37 of the platten, thence through the plastic sheets p—p' to the inner surfaces or faces 45—46 of the magnetic bars 15—16, respectively, which are grounded in the oscillator circuit 14.

In connection with the foregoing, it should be understood that the electrode E is calculated to have a face area which is considerably less than the area of inner faces 45—46 of the magnetic bars 15—16. Moreover, since the plastic sheets p—p' are interposed between their respective magnetic beds 18—19 and the adjacent edges of the platten 35 the plastic in the path of the high frequency current acts as a di-electric in a capacitor. Therefore, the full heating effect will be on the face area of the electrode E and neither on the faces 45—46, which are at least 10 times greater in area, nor on the bottom surface 37 of the platten which is fed by di-electric means through the plastic sheeting. I have found that by providing the electrode E with approximately one tenth (1/10) the face area of the magnetic bars sufficient resistance is afforded to create the necessary temperature at the point of weld between the electrode and the platten to make a good weld or bond in the overlapped ends e—e' of the plastic sheeting.

It should here be noted that the magnetic press bed and movable platten 35 can also be employed in combination with other forms of heat sealing means, for example, such as the one shown in Fig. 5 in this case. Briefly, the heat sealing means of Fig. 5 is a straight electrical type in which the electrode E is replaced by a resistance wire, blade or bar 32' having its ends connected to wires 51 and 52 connected to the secondary winding 53 of a transformer 54. The primary side 55 of the transformer 54 has one side connected to a source of electrical power (not shown) and its opposite side provided with a rheostat 56, the control knob 57 of which is connected to a timer 58 and thence to the source of power. This electrical sealing means of Fig. 5 is satisfactory for creating sufficient heat in the blade or bar 32' to effect a weld or bond in materials such as polyethylene, acetate films and like Pliofilms of certain grades when placed in the press of the present invention in the manner above explained.

From the foregoing, it will be apparent that the magnetic press of the present invention functions suitably with any bar or blade (32 or 32') which creates heat sufficiently to accomplish the bonding weld in the material during attraction of the platten 35 toward the press bed. In addition to this attribute of the magnetic press, the arrangement and construction of the latter forming a zone 17 confined between the magnetic bars 15—16, platten 35 and the upper wall 20 of the generator cabinet 12 has the additional advantage of providing a shield around the hot electrode E and those parts of the oscillator circuit 14 within the zone 17.

As is well known, high frequency energy travels along the surface of the conductive elements in such types of circuit and follows the course of least resistance within such circuits. It is this phenomenon which heretofore caused the escape of high frequency wave lengths in devices embodying a hot electrode in movable press members overhanging the press bed. In the device of the present invention, the high frequency heat sealing portion and connections thereof all being confined within the zone 17, the sides 15—16 of which are circuit elements which are grounded, assures against radiation of high frequency waves from the zone 17.

As a further assurance against radiation of high frequency waves, the lower surface 37 of the platten 35 as well as the inner surfaces or faces 45—46 of the magnetic bars 15—16 are plated with a coat of copper or silver affording greater surface conduction as well as a shield for reflecting any high frequency waves back toward the electrode. Moreover, the electrode (bar 32) being slightly shorter than the length of the press bed as hereinbefore explained minimizes the possibility of radiation of high frequency waves at the ends of the press bed. With such arrangement the escape or radiation of high frequency waves from the zone 17 is appreciably minimized if not eliminated.

From the foregoing and in summary, it will be appreciated that the structure and arrangement as herein described provides a press bed embodied in a flat table affording the possibility of joining large sheets of material of unlimited size. In other words, since there is no need for an upstanding arm or gooseneck in the present structure, the material can be laid absolutely flat upon a table with the edges to be joined placed in overlapped condition at the electrode E.

In addition to the foregoing, the magnets on either side of the electrode serve a double purpose in functioning as a press while attracting the movable plate or platten down upon the table as well as a clamp for holding the material firmly adjacent the lapped edges thereof. In this manner, the lapped edges of the material will not shift or become distorted during the sealing operation irrespective of any movement, stretching or shifting of the balance of the material outside the sealing zone. This is a highly advantageous feature of the present invention when it is considered that it is conducive to movement of the sheet material for wrapping and/or feeding purposes during the actual sealing operation.

The energization of the electromagnets for purposes of attracting the platten during the pressing operation simultaneously serves as a switch or circuit completing action for the high frequency circuit. Consequently the sealing or welding operation automatically occurs upon operation of the press. This attribute of the present invention is afforded due to the unique arrangement of the electrode in parallelism with and between the magnetic bars and the bridging or covering of them by the movable plate or platten.

The foregoing arrangement is further conducive to the novel shielding aspects of this invention whereby high frequency waves are confined within the sealing zone and will not emanate or escape from the press bed.

From the foregoing it will be appreciated that the structure embodied in the present invention affords a simple yet effective press, press bed and control as well as a unique shield against escape of high frequency waves.

While I have described the invention herein in specific detail, it will be apparent to those skilled in the art that it is susceptible to variations, modifications and/or alterations without departure from the spirit of my invention. I therefore desire to avail myself of all variations, modifications, and/or alterations as fairly come within the purview of the appended claims.

What I claim as new and desire to protect by Letters Patent is:

1. Apparatus for heat sealing plastic films and the like comprising a press bed disposed in a common plane for supporting separate sheets of plastic film thereon incident to welding of the same together, a pair of magnetic bars extending across said press bed in spaced parallel relation with their upper faces disposed in said common plane, a press blade disposed between and in parallel relation to said magnetic bars with its upper surface congruent to said common plane for supporting the edges of separate sheets of plastic film in overlapped relation between said magnetic bars, a movable platten overlying said spaced magnetic bars magnetically attractable toward the same for compressing the overlapped edges of said plastic film against said press blade, a high frequency generator circuit having direct connection with said press blade and ground connection with said magnetic bars for completing said high frequency circuit upon magnetic attraction of said platten against said press blade, said overlapped edges of said plastic film providing a dielectric resistance between said press blade and platten for creating high frequency heat in said plastic film at the line of compression thereof between said press blade and platten for welding said sheets together along said line of compression thereof.

2. Apparatus for heat sealing plastic films and the like comprising a press bed disposed in a common plane for supporting separate sheets of plastic film thereon incident to welding of the same together, a pair of magnetic bars extending across said press bed in spaced parallel relation with their upper faces disposed in said common plane, a press blade disposed between and in parallel relation to said magnetic bars with its upper surface congruent to said common plane for supporting the edges of separate sheets of plastic film in overlapped relation between said magnetic bars, a high frequency circuit having direct connection with said press blade and ground connection with said magnetic bars, a movable platten magnetically attractable toward said spaced magnetic bars for creasing the overlapped edges of said plastic film to substantially single sheet thickness along said press blade and for completing said high frequency circuit between said press blade and said grounded magnetic bars, said overlapped edges of said plastic film serving as a dielectric resistance for creating heat in said overlapped edges of said plastic film at the line of creasing thereof between said press blade and said platten for welding the overlapped edges of said plastic film together.

3. Apparatus for heat sealing plastic films and the like comprising a press bed disposed in a common plane for supporting separate sheets of plastic film incident to welding of the same together, a pair of magnetic bars extending across said press bed in spaced parallel relation with their upper faces disposed in said common plane, a press blade disposed between and in parallel relation to said magnetic bars with its upper surface congruent to said common plane for supporting the edges of separate sheets of plastic film in overlapped relation between said magnetic bars, a high frequency circuit having direct connection with said press blade and ground connection with said magnetic bars, a movable platten magnetically attractable toward said spaced magnetic bars for compressing the overlapped edges of said plastic film to a crease of substantially single sheet thickness along said press blade and for completing said high frequency circuit between said press blade and said grounded magnetic bars, said overlapped edges of said plastic film between said press blade and platten providing a dielectric resistor in said high frequency circuit creating heat along the crease formed in the overlapped edges of said plastic film by said press blade and platten to thereby weld said plastic films together, and said grounded magnetic bars and said platten providing a shielding zone around said press blade for confining high frequency wave lengths emanating from the latter below said press bed.

4. Apparatus for heat sealing plastic films and the like comprising a high frequency circuit embodying a generator enclosed in a shielded housing, a press bed disposed in a common plane above said housing for supporting separate sheets of plastic film incident to welding of the same together, a pair of magnetic bars supported on said housing and grounded to said high frequency circuit, said magnetic bars extending across said press bed in spaced parallel relation with their upper faces disposed in said common plane, a press blade disposed between and in parallel relation to said magnetic bars with its upper surface congruent to said common plane for supporting the edges of separate sheets of plastic film in overlapped relation between said magnetic bars, said press blade being insulated relative to said housing, and having direct connection with said high frequency circuit, a movable platten magnetically attracted toward said spaced magnetic bars for impressing a crease of single sheet thickness into the overlapped edges of said plastic film along said press blade and for simultaneously completing said high frequency circuit between said press blade and said grounded magnetic bars, the overlapped edges of said plastic film affording dielectric resistance along said crease line creating sufficient heat to form a weld in said plastic film along said crease line, and said shielded housing, and said magnetic bars supported thereon together with said platten providing a shield around said press blade for confining high frequency waves emanating from the latter below said press bed.

5. Apparatus for heat sealing plastic films and the like comprising a high frequency circuit embodying a generator enclosed in a shielded housing, a press bed disposed in a common plane above said housing for supporting separate sheets of plastic film incident to welding of the same together, a pair of magnetic bars extending across said press bed in spaced parallel relation with their upper faces disposed in said common plane and their lower faces supported on said housing and grounded to said high frequency circuit, a press blade disposed between and in parallel relation to said magnetic bars with its upper surface congruent to said common plane for supporting the edges of separate sheets of plastic film in overlapped relation between said magnetic bars and having direct connection with said high frequency circuit, a movable platten magnetically attracted toward said spaced magnetic bars for compressing the overlapped edges of said plastic film against said press blade while gripping said separate sheets of plastic film relative to the respective magnetic bars supporting the same, the surface area of the upper faces of said magnetic bars having substantially ten times greater area in contact with said plastic film than said press blade and said overlapped edges of said plastic film providing dielectric resistance to thereby create sufficient heat to weld that portion of the overlapped edges of said plastic film compressed between said press blade and said platten.

6. Apparatus for heat sealing plastic films and the like comprising a high-frequency generator enclosed in a housing and embodying a high-frequency circuit, a pair of magnetic bars supported by and grounded to one wall of the housing of said generator with their extended edges disposed in a common plane, a press bed having a material supporting surface disposed in said common plane for supporting sheets of plastic material along the same, an electrode press bar connected to said high frequency circuit disposed between said pair of magnets for engaging overlapped edges of said sheet material therebetween at said common plane, a movable plate magnetically attractable toward said extended edges of said magnetic bars to press said overlapped edges of said sheet material against said electrode bar, said movable plate completing said high frequency circuit between said electrode press bar and said grounded magnetic bars while cooperating with said bar magnets and said one wall of said high frequency generator housing to provide a shield around said electrode bar for minimizing escape of high-frequency waves therefrom said extended edges of said magnetic bars having a substantially greater area than the area of said electrode bar and said overlapped edges of said plastic sheet material constituting a dielectric capacitor in said high frequency circuit for creating heat and effecting a welding of said overlapped edges of said sheet material along the line of engagement thereof by said electrode bar.

7. Apparatus for heat sealing plastic films and the like comprising a high-frequency generator and circuit, a pair of magnetic bars secured to the top of said generator with their upper edges disposed in a common plane, manually controlled electromagnetic coils associated with said magnetic bars for optionally magnetizing the same, a press table having its upper surface disposed in said common plane for supporting plastic sheet material thereon, an electrode bar between said pair of magnetic bars for supporting said sheet material therebetween in overlapped condition, a movable plate adapted to overlie the upper surfaces of said magnetic bars, means for energizing said electromagnetic coils to thereby magnetize said magnetic bars and attract said plate down upon said electrode bar, said electrode bar being connected to said high frequency generator circuit and said magnetic bars being grounded to said high frequency circuit whereby said movable plate effects completion of said high frequency circuit when attracted toward said magnetic bars, said movable plate cooperating with said bar magnets and the upper surface of said high frequency generator to confine said electrode bar within a sealing zone, and a high frequency shield on the inner surfaces of said bar magnets and movable plate for maintaining high frequency waves within said sealing zone.

8. Apparatus for heat sealing plastic films and the like comprising a high-frequency generator and circuit, a pair of magnetic bars secured to the top of said generator with their upper edges disposed in a common plane, manually controlled electromagnetic coils associated with said magnetic bars for optionally magnetizing the same, a press table having its upper surface disposed in said common plane for supporting plastic sheet material thereon, an electrode bar between said pair of magnetic bars for supporting said sheet material therebetween in overlapped condition, a movable plate adapted to overlie the upper surfaces of said magnetic bars, means for energizing said electromagnetic coils to thereby magnetize said magnetic bars and attract said plate down upon said electrode bar, said electrode bar being connected to said high frequency generator circuit and said magnetic bars being grounded to said high frequency circuit whereby said movable plate effects completion of said high frequency circuit when attracted toward said magnetic bars, said press blade having substantially one tenth the surface area of said magnetic bars at the point of contact thereof with said plastic films to constitute a capacitor in said high frequency circuit and the overlapped edges of said plastic films forming a dielectric in said capacitor for effecting a weld between the overlapped edges of said plastic films at the point of compression thereof between said press blade and said plate, said movable plate cooperating with said bar magnets and the upper surface of said high frequency generator to confine said electrode bar within a sealing zone, and a high frequency shield on the inner surfaces of said bar magnets and movable plate for maintaining high frequency waves within said sealing zone.

9. Apparatus for heat sealing plastic films and the like comprising a high-frequency generator and circuit, a pair of magnetic bars secured to the top of said generator with their upper edges disposed in a common plane, manually controlled electromagnetic coils associated with said magnetic bars for optionally magnetizing the same, a press table having its upper surface disposed in said common plane for supporting plastic sheet material thereon, an electrode bar between said pair of magnetic bars with its upper extremity congruent to said common plane for supporting said sheet material therebetween in overlapped condition, a movable plate adapted to overlie the upper surfaces of said magnetic bars, means for energizing said electromagnetic coils to thereby magnetize said magnetic bars and attract said plate down upon said electrode bar, the single thickness of said sheet material between the upper edges of said magnetic bars and said plate serving as a gauge to limit the compression of the overlapped portions of said sheet material to a crease line of substantially single sheet thickness between said electrode bar and said plate, said electrode bar being connected to said high frequency generator circuit, and said magnetic bars being grounded to said high frequency circuit whereby said movable plate effects completion of said high frequency circuit when attracted toward said magnetic bars, said overlapped portions of said sheet material between said electrode bar and plate constituting a dielectric resistance in said high frequency circuit for creating heat in said dielectric to weld the same together, said movable plate cooperating with said bar magnets and the upper surface of said high frequency generator to confine said electrode bar within a sealing zone, and a high frequency shield on the inner surfaces of said bar magnets and movable plate for maintaining high frequency waves within said sealing zone.

References Cited in the file of this patent
UNITED STATES PATENTS

| | | |
|---|---|---|
| 2,358,455 | Hallman | Sept. 19, 1944 |
| 2,460,460 | Langer | Feb. 1, 1949 |
| 2,479,375 | Langer | Aug. 16, 1949 |
| 2,532,419 | Payzant | Dec. 5, 1950 |
| 2,539,375 | Snyder | Jan. 23, 1951 |
| 2,539,646 | Welch | Jan. 30, 1951 |
| 2,625,201 | Smith | Jan. 13, 1953 |
| 2,705,523 | Hasselquist | Apr. 5, 1955 |
| 2,713,379 | Sisson | July 19, 1955 |